US008103844B2

(12) United States Patent
Beaver (10) Patent No.: US 8,103,844 B2
(45) Date of Patent: Jan. 24, 2012

(54) SECURE DIRECT PLATTER ACCESS

(76) Inventor: Donald Rozinak Beaver, Pittsburgh, PA (US)

( * ) Notice: Subject to any disclaimer, the term of this patent is extended or adjusted under 35 U.S.C. 154(b) by 743 days.

(21) Appl. No.: 12/012,261

(22) Filed: Feb. 1, 2008

(65) Prior Publication Data
US 2009/0198932 A1 Aug. 6, 2009

(51) Int. Cl.
G06F 12/00 (2006.01)
(52) U.S. Cl. .................... 711/163; 711/E12.091
(58) Field of Classification Search .................. None
See application file for complete search history.

(56) References Cited

U.S. PATENT DOCUMENTS

| 5,265,159 | A | 11/1993 | Kung |
| 5,375,243 | A | 12/1994 | Parzych et al. |
| 5,661,799 | A | 8/1997 | Nagel et al. |
| 5,677,952 | A | 10/1997 | Blakley, III et al. |
| 5,748,744 | A | 5/1998 | Levy et al. |
| 5,870,468 | A | 2/1999 | Harrison |
| 6,134,660 | A | 10/2000 | Boneh et al. |
| 6,199,163 | B1 | 3/2001 | Dumas et al. |
| 6,298,401 | B1 | 10/2001 | Anderson |
| 6,321,358 | B1 | 11/2001 | Anderson |
| 6,625,734 | B1 | 9/2003 | Marvit et al. |
| 6,687,826 | B1 | 2/2004 | Owa |
| 6,704,838 | B2 | 3/2004 | Anderson |
| 6,715,050 | B2 | 3/2004 | Williams et al. |
| 6,915,435 | B1 | 7/2005 | Merriam |
| 6,993,661 | B1 | 1/2006 | Garfinkel |
| 2001/0053221 | A1 | 12/2001 | Takeda |
| 2002/0103964 | A1 | 8/2002 | Igari |
| 2002/0133702 | A1* | 9/2002 | Stevens .................... 713/163 |
| 2002/0133741 | A1 | 9/2002 | Maeda et al. |
| 2002/0188856 | A1 | 12/2002 | Worby |
| 2002/0199099 | A1 | 12/2002 | Shirai et al. |
| 2003/0014639 | A1 | 1/2003 | Jackson et al. |
| 2003/0037248 | A1 | 2/2003 | Launchbury et al. |

(Continued)

FOREIGN PATENT DOCUMENTS

JP 2003-069551 3/2003

(Continued)

OTHER PUBLICATIONS

Liskov, et al., "Tweakable Block Ciphers", Advances in Cryptology—Crypto 2002, $22^{nd}$ Annual International Cryptology Conference (2002), pp. 1-16.

(Continued)

Primary Examiner — Pierre-Michel Bataille
Assistant Examiner — John P Fishburn
(74) Attorney, Agent, or Firm — Kirk A. Cesari (57) ABSTRACT

Bulk data transfers by directly accessing a persistent and secured area on the data storage device, e.g., a disk drive having a magnetic storage medium, without relying on the system operating system to execute its read/write operations. For a disk drive, the Protected Area Run Time Interface Extension (PARTIES) technology is applied to create and organize a secured sub-area within a secured storage area. The secured sub-area is a data buffer to and from which large data file transfers can be made with data authenticity and confidentiality. Since this new secured sub-area is not organized and protected by the operating system, it is inherently protected from attack by viruses or Trojan horse software whose effectiveness depends on their ability to maliciously direct the operating system. In addition, the read/write operations bypass command payload limits while reducing data and command validation costs.

19 Claims, 8 Drawing Sheets

General Operation Process Flow Chart

U.S. PATENT DOCUMENTS

| | | | |
|---|---|---|---|
| 2003/0046563 A1 | 3/2003 | Ma et al. | |
| 2003/0065925 A1 | 4/2003 | Shindo et al. | |
| 2003/0070083 A1 | 4/2003 | Nessler | |
| 2003/0120918 A1 | 6/2003 | VanDer Kamp | |
| 2003/0135350 A1* | 7/2003 | Cheston et al. | 702/186 |
| 2003/0140239 A1 | 7/2003 | Kuroiwa et al. | |
| 2003/0169878 A1 | 9/2003 | Miles | |
| 2003/0177379 A1 | 9/2003 | Hori et al. | |
| 2003/0182566 A1 | 9/2003 | Kohara et al. | |
| 2003/0226026 A1 | 12/2003 | Magoshi | |
| 2003/0229768 A1* | 12/2003 | Kawano et al. | 711/165 |
| 2003/0229774 A1* | 12/2003 | Freeman et al. | 713/1 |
| 2004/0003275 A1 | 1/2004 | Nakada et al. | |
| 2004/0015711 A1 | 1/2004 | Ogura | |
| 2004/0030908 A1 | 2/2004 | Lin et al. | |
| 2004/0030909 A1 | 2/2004 | Sako et al. | |
| 2004/0064718 A1 | 4/2004 | Harrington et al. | |
| 2005/0050342 A1 | 3/2005 | Boivie et al. | 713/193 |
| 2005/0166213 A1* | 7/2005 | Cromer et al. | 719/315 |
| 2005/0193058 A1* | 9/2005 | Yasuda et al. | 709/203 |
| 2005/0238175 A1 | 10/2005 | Plotkin et al. | 380/281 |
| 2006/0253724 A1* | 11/2006 | Zhang | 714/2 |
| 2008/0172562 A1 | 7/2008 | Cachin et al. | 713/193 |

FOREIGN PATENT DOCUMENTS

| | | |
|---|---|---|
| JP | 2003/218850 | 7/2003 |
| JP | 2003-271457 | 9/2003 |
| JP | 2003-281071 | 10/2003 |
| WO | WO 03/027816 | 4/2003 |

OTHER PUBLICATIONS

Clement Kent, "Draft Proposal for Tweakable Narrow-Block Encryption", Draft 1.00:00, IEEE P1619, Apr. 15, 2004, pp. 1-19.

IEEE, "Draft Standard Architecture for Encrypted Shared Storage Media", IEEE P1619 D5, Mar. 23, 2006.

National Institute of Standards and Technology (NIST), "Recommendation for Block Cipher Mode Operations: Galois/Counter Mode (GCM) and GMAC", NIST Special Publication 800-38D, Nov. 2007.

Office Action from the United States Patent and Trademark Office for U.S. Appl. No. 12/012,260, dated Nov. 18, 2010.

Office Action from the United States Patent and Trademark Office for U.S. Appl. No. 12/012,262, dated Nov. 30, 2010.

* cited by examiner

FIG. 6 DPA Read Process Flow Chart

FIG. 7 DPA Write Process Flow Chart

FIG. 8 General Operation Process Flow Chart

SECURE DIRECT PLATTER ACCESS

FIELD OF INVENTION

The invention relates to magnetic storage systems, and more particularly to the secured bulk transfer of data to and from a magnetic disk drive.

BACKGROUND OF THE INVENTION

The magnetic storage medium in a conventional disk drive may be divided into several storage areas. One of these storage areas known as the User Area and it is set aside for normal storage use by the computer user. The user is normally allowed unrestricted access to this User Area through the operating system of the host device via a standard interface such as Advanced Technology Attachment (ATA) or Small Computer System Interface (SCSI), and employing addressing schemes such as Logical Block Addresses (LBA's). When user access control is needed, password protection is often used to enable or disable read and/or write operations to the User Area. However, read and/or write access authorization to the User Area alone does not provide adequate security protection because no integrity verification or origin authentication is performed on the transmitted data. In addition, the scope of password-enabled read/write authorization is often too broad since the authorization usually applies to the entire User Area or its partitions. Proposals for a specific authorization protocol that applies to individual data blocks have been made but they rely on authorization or authentication to be tested for each block transfer. This approach reduces the speed of the read/write operation, especially when the operation involves a relatively large data file.

The same disk drive may also contain another storage area that is created by the disk drive vendor and is referred to as the Hidden System Area. This storage area is unseen by and inaccessible to the user during normal operation. The Hidden System Area is usually fixed in size, less than one megabyte, and used for keeping system data such as the firmware of the disk drive.

In addition to the magnetic storage medium, a conventional disk drive uses a temporary data buffer in the form of volatile RAM in the host system (e.g. a server). This RAM buffer is used to cache read and write data and to perform verification and authentication operations on the cached data. A disadvantage of caching data to a volatile RAM buffer is that the data set may be too large for the data buffer. This approach imposes an artificial limit on the net data size. One method to overcome the size limitation issue is to increase the volatile RAM buffer size. However, volatile RAM buffer memory often uses relatively more expensive memory chips. Therefore, adding more memory chips to increase the buffer size will add cost to the disk drive. Another method is to create a special buffer storage area on the storage medium and to perform data verification and authentication on the temporarily stored data. Unfortunately, a specialized buffer storage area requires significant resources from the operating system to create, manage and protect. The foregoing drawbacks in the prior art are exacerbated when handling transfers of bulk volume of data from one storage location to another, such as between network attached storage (NAS) devices, where high speed broadband data transfer would meet "last mile" bottleneck in data handling at the destination or source drives.

What is needed is a magnetic disk drive system, and method, which allow bulk data transfers with high-speed data verification and authentication operations requiring minimal operating system resources.

SUMMARY OF THE INVENTION

The present invention is directed to a system and process for bulk data transfer for data storage devices, such as magnetic disk drives, which uses high-speed read/write operations to access a persistent and protected or secured storage area on the data storage device for buffering or temporary storage of data to be read from or written to a normal user data storage area (i.e., for endpoint storage) on the data storage device. The novel process does not rely on the operating system to execute its read/write operations. As a result, the novel process allows the read/write operations in relation to the temporary storage area to bypass the command payload limits while reducing its data and command validation costs.

In one aspect, the present invention provides direct platter access to protected or secured areas defined in a magnetic disk drive. One embodiment of the present invention manipulates an existing mechanism called the Protected Area Run Time Interface Extension Services (PARTIES) technology to create and organize a secured storage sub-area within a secured storage area called the PARTIES Area. Since the novel process supports large data file transfers to and from the secured sub-area and can ensure data authenticity and confidentiality, the present invention may effectively use such secured sub-area as a data buffer for read/write operations. Since this new secured sub-area is not organized and protected by the operating system, it is inherently protected from attack by viruses or Trojan horse software whose effectiveness depends on their ability to maliciously direct the operating system. In addition, the novel process allows the read/write operations to bypass the command payload limits while reducing data and command validation costs since the operating system is not relied upon to execute read/write operations.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION

The present description is of the best presently contemplated mode of carrying out the invention. This description is made for the purpose of illustrating the general principles of the invention and should not be taken in a limiting sense. The scope of the invention is best determined by reference to the appended claims. This invention has been described herein in reference to various embodiments and drawings. It will be appreciated by those skilled in the art that variations and improvements may be accomplished in view of these teachings without deviating from the scope and spirit of the invention.

In one aspect, the present invention is directed to a system and process for bulk data transfer for data storage devices, such as magnetic disk drives, which uses high-speed read/write operations to access a persistent and secured temporary storage area on the storage medium for buffering or temporary storage of data when reading from or writing to a normal user data storage area (i.e., for endpoint data storage) on the storage medium. The novel process does not rely on the operating system to execute its read/write operations in relation to the temporary storage area. As a result, the novel process allows the read/write operations to bypass the command payload limits while reducing its data and command validation costs. For magnetic disk drives, the present invention manipulates an existing mechanism called the PARTIES technology to create and organize a secured storage area. The PARTIES technology makes use of the Host Protected Area feature set to provide management of another protected area on a hard disk drive of a computer system. This technology can be found in the following specifications: NCITS 346, ANSI NCITS 306 (SCSI-3 Block Commands) and ANSI NCITS 340 (ATAPI-5). The PARTIES and ATA/ATAPI-5 standards allow an area of a hard drive to be both organized and protected from access by the user during normal system operation. This storage area is designated as the PARTIES Area, is usually located at the end of the storage medium, and is divided into service areas via a Boot Engineering Extension Record (BEER). These individual service areas can be used to support specialized functions such as providing an emergency boot location and other diagnostic services.

The PARTIES technology involves four distinct software layers. The first layer detects the presence of a PARTIES area on the hard drive and is called the discovery phase. The second layer allows the selection of a fail-safe boot service and is called the boot selection layer. The third layer provides a simulated drive A: from a reserved area on the hard drive when a fail-safe boot service is selected and is called simulation layer. The fourth layer allows a way to create, access and delete other PARTIES services and is called manipulation layer. These layers can be found in the ANSI PARTIES specifications that provide specific details on formatting and finding PARTIES services.

There are several known methods to manipulate PARTIES services into allowing access to the PARTIES Area during normal operations. The first approach is to use applications such as DOS-based programs to initialize the host-protected area, in addition to adding and deleting PARTIES services. Another approach manipulates the firmware, such as the Basic Input Output System (BIOS), of the host system during the SETUP or during run-time. For example, one method to manipulate the BIOS into providing access to the PARTIES Area is to have the BIOS not issue a SET MAXIMUM lock command prior to launching the operating system. Another method is to successfully issue a SET MAXIMUM UNLOCK command to gain access to the storage area normally set aside for system usage.

By way of illustration and not limitation, the present invention will be described in connection with a networked storage server that incorporates a novel bulk data transfer method between the server and a magnetic disk drive, and in particular a disk drive system that has an onboard processor or controller that handles the data authentication and verification process. It will be appreciated that process of the invention may also be supported by one or more general purpose or application specific processors, a controller card, or an information processing system such as a computer to provide the creation and organization of the secured sub-area and to facilitate the transfer of the bulk data in accordance with the principles of the present invention.

Figure 1:
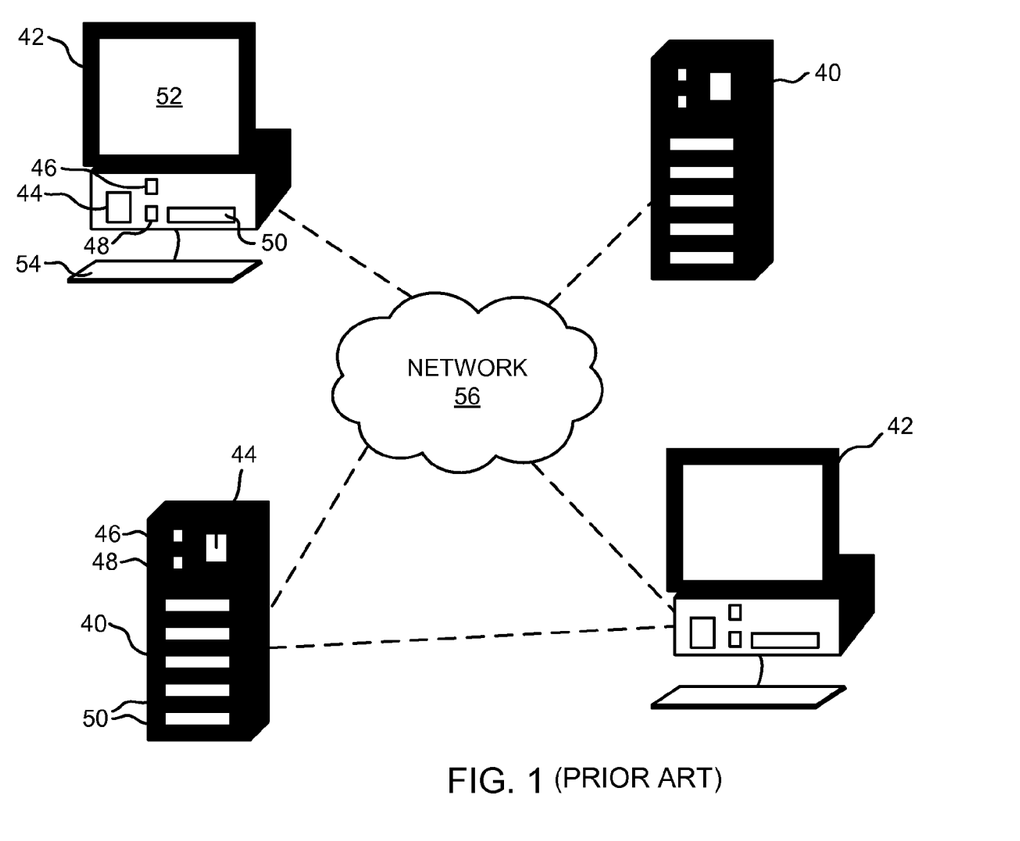
FIG. 1 is a schematic diagram of networked servers and computing devices that utilize a bulk data transfer scheme in accordance with the present invention.

FIG. 1 is a block diagram of an example networked server 40 or computing device 42 that can use a bulk data transfer scheme in accordance with this invention. A server 40 or computing device 42 is comprised of a processor 44, a volatile memory unit 46, a nonvolatile memory unit 48 and a mass storage device 50. The processor 44 is coupled to a volatile memory unit 46 that acts as the system memory. An example of a volatile memory unit 46 is dynamic random access memory (DRAM). The processor 44 is also coupled to a nonvolatile memory unit 48 that is used to hold an initial set of instructions such as the system firmware. The processor 44 is also coupled to the mass storage device 50 that can be used to store data files and instruction sets such as the operating system. The mass storage device 50 can be of any type or combination of types of a magnetic disk drive, a compact disk (CD) drive, a digital video disk (DVD) drive, a floppy disk drive, a Zip drive, a SuperDisk drive, a Magneto-Optical disk drive, a Jazz drive, a high density floppy disk (HiFD) drive, flash memory, read only memory (ROM), programmable read only memory (PROM), erasable programmable read only memory (EPROM), or electrically erasable programmable read only memory (EEPROM). The server 40 or computing device 42 may also include a video output device 52 such as a flat panel monitor to display information to the user, and an input device 54 such as a keyboard or a tablet to accept inputs from the user. The server 40 or computing device 42 may be connected to each other via a network 56 using wired (e.g., copper wire or optical fiber) and/or wireless connections. The server 40 or computing device 42 may also comprise of several processors 44, volatile memory units 46, nonvolatile memory units 48 and mass storage devices 50 each residing in different physical locations and are interconnected via a network 56 without departing from the scope of the present invention. It will be appreciated by those skilled in the art that the process of the invention may also be partially or fully handled by a processor that resides on a controller card (not shown) or on the mass storage device 50 to provide the creation, organization and/or security of the secured sub-area.

Figure 2:
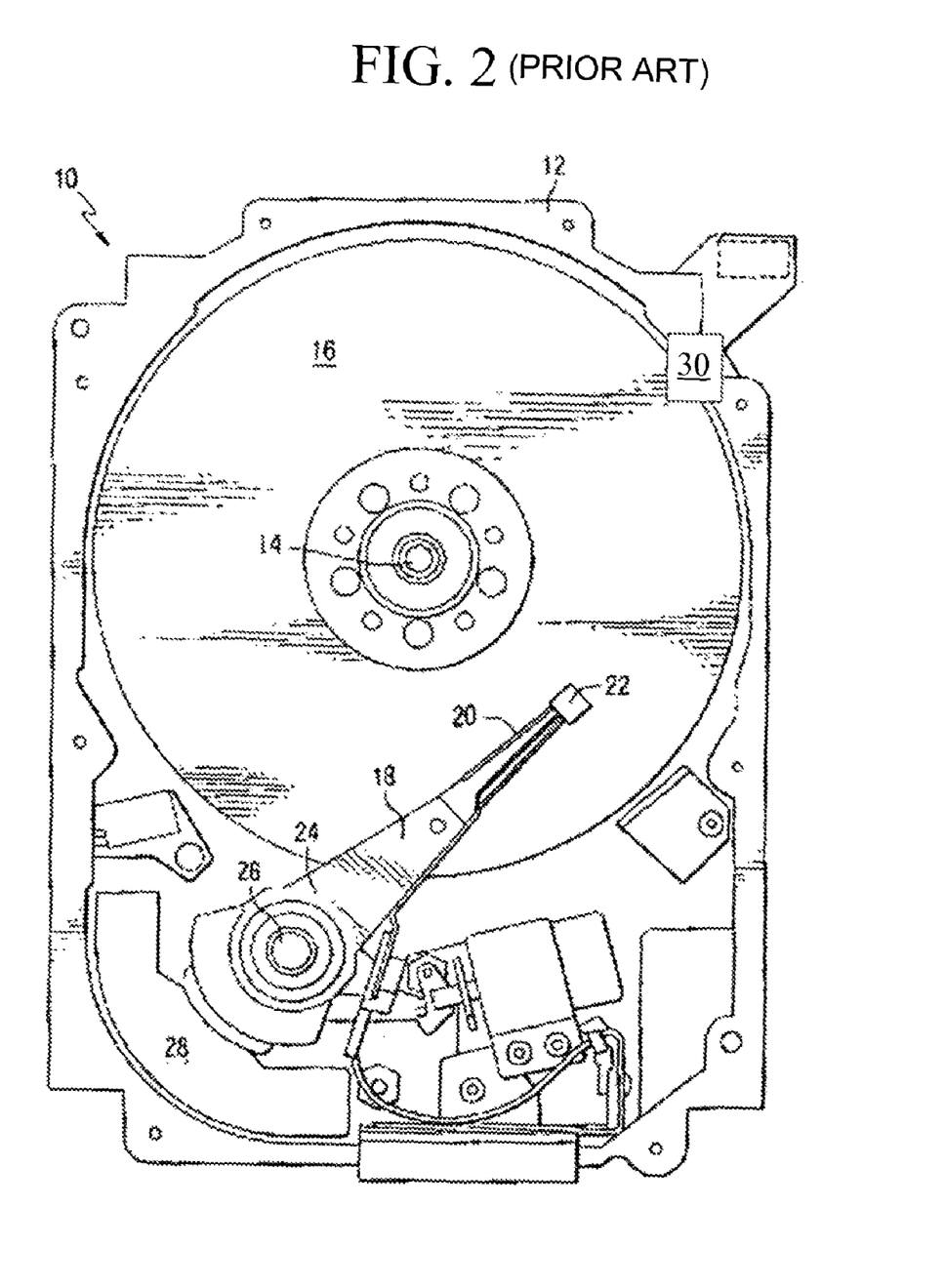
FIG. 2 is a representation of a disk drive that can employ a bulk data transfer scheme in accordance with the principles of the present invention.

FIG. 2 is an illustration of a disk drive 10 that can be used to implement a bulk data transfer scheme in accordance with this invention. The disk drive 10 includes a housing 12 (with the upper portion removed and the lower portion visible in this view) sized and configured to contain the various components of the disk drive. The disk drive 10 includes a spindle motor 14 for rotating at least one magnetic storage medium 16 within the housing. A suspension assembly having at least one arm 18 is contained within the housing 12, with each arm 18 having a first end 20 with a transducer in the form of a recording head supported on a slider 22, and a second end 24 pivotally mounted on a shaft by a bearing 26. An actuator motor 28 is located at the arm's second end 24 for pivoting the arm 18 to position the recording head 22 over a desired sector or track of the disk 16. The actuator motor 28 and other components are regulated by a controller 30, which may also be implemented with the bulk data transfer scheme in accordance with the disclosure below.

Figure 3:
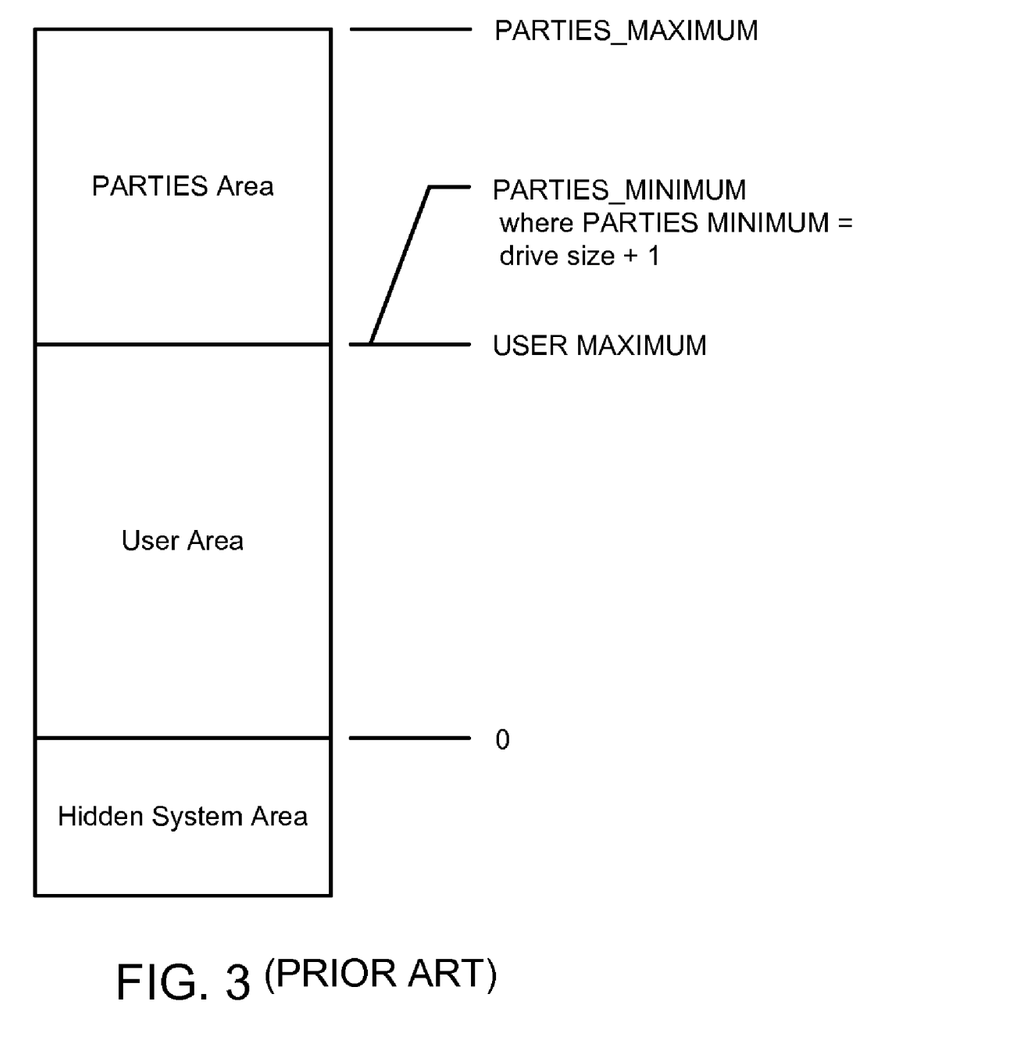
FIG. 3 illustrates a storage area layout of a magnetic disk drive having a secured PARTIES Area that was created and organized using PARTIES technology.

FIG. 3 refers to the LBA ranges in a disk drive that includes a secured PARTIES Area. FIG. 3 depicts the three main storage areas of a PARTIES enabled disk drive: a User Area (for normal or endpoint data storage), a Hidden System Area, and a PARTIES Area. The storage blocks can be organized and addressed according to their LBA values. The LBA ranges for these three storage areas may use the following convention. In the User Area, the LBA's may range from zero to a value called USER_MAXIMUM, where the USER_MAXIMUM value is set by the SET MAXIMUM command and it is the maximum LBA value that the device makes available for user storage. In the PARTIES Area, the LBA's range from a minimum value called PARTIES_MINIMUM, where the PARTIES_MINIMUM is typically one greater than the designated drive size advertised via ATA to the host operating system, to a maximum value called PARTIES_MAXIMUM.

Figure 4:
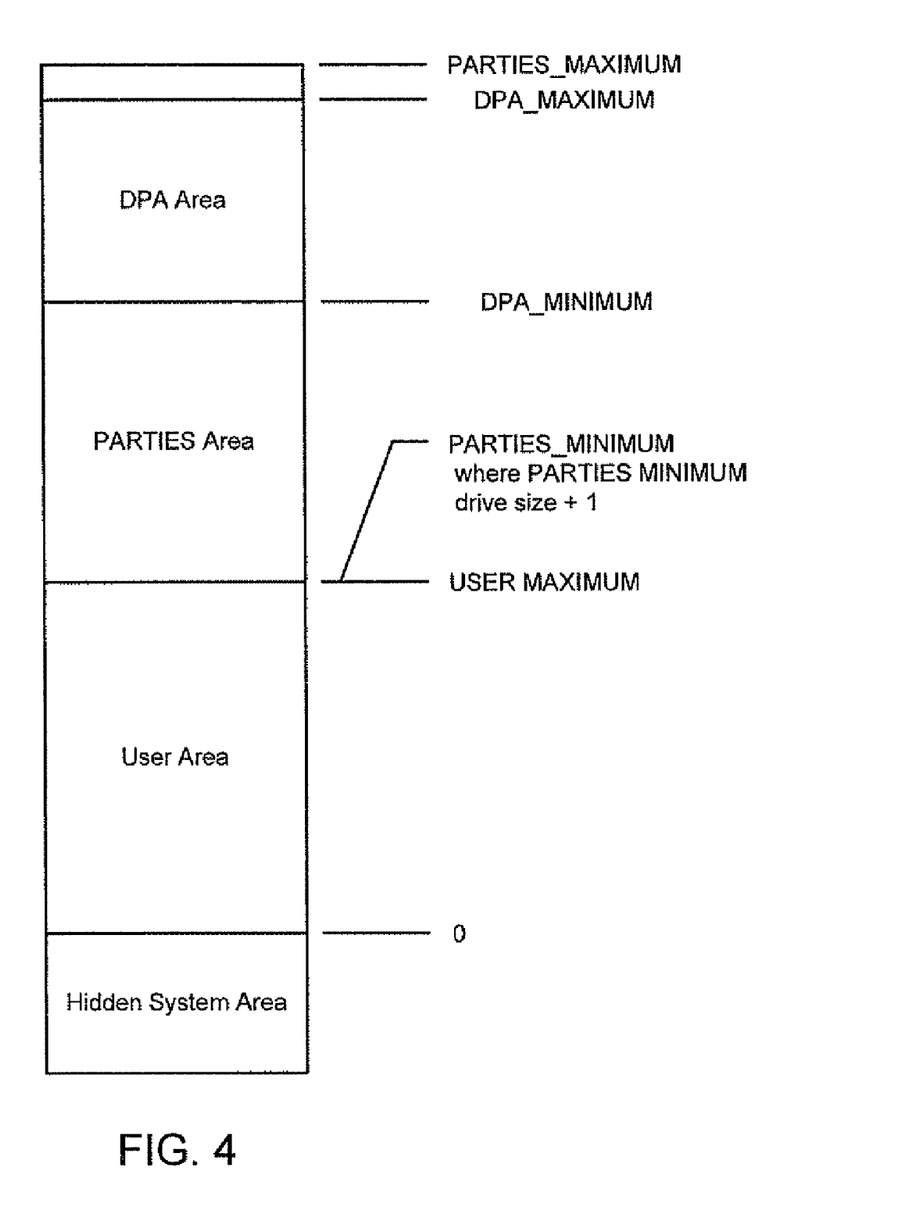
FIG. 4 illustrates a storage area layout of a magnetic disk drive having a secured sub-area within the PARTIES Area, which was created and organized using PARTIES technology.

FIG. 4 refers to an embodiment that uses the PARTIES mechanism to organize and protect a sub-area within the PARTIES Area. The PARTIES technology can be used to set aside a secured sub-area within the PARTIES Area to facilitate bulk data transfer between the host device and the disk drive. This bulk transport process is called Direct Platter Access (DPA) and the secured sub-area may be referred to as the DPA Area. The LBA's used for the DPA Area is set above the LBA range set aside for the User Area, and range from a minimum value called DPA_MINIMUM to a maximum value called DPA_MAXIMUM. Using PARTIES technology, the disk drive may act on inquiries into LBA's that are within the range set by DPA_MINIMUM and DPA_MAXIMUM.

Figure 5:
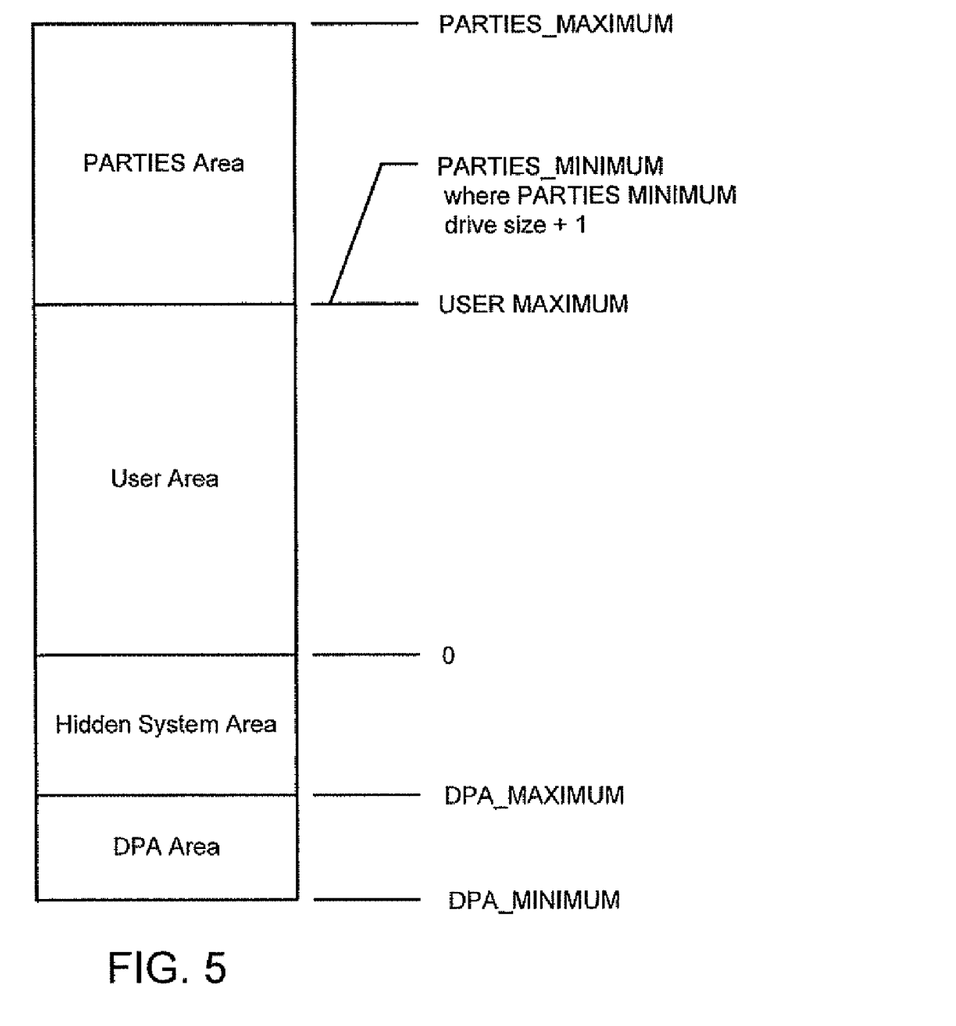
FIG. 5 illustrates a storage area layout of a magnetic disk drive having a secured sub-area within the Hidden System Area, which was created and organized using PARTIES technology.

FIG. 5 refers to an alternate embodiment that organizes and protects a sub-area outside of the PARTIES Area, for example, within the Hidden System Area. The Hidden System Area normally does not use LBA's to address its storage blocks. However, standard mechanism exists that can set aside a range of LBA's to refer to a physical storage location within Hidden System Area. Once an LBA range is set aside for the exclusive use of bulk data transfer, the LBA addresses must be interpreted by the drive as pertaining to the Hidden System Area, or the command and/or command parameters must specify that the target region be within the Hidden System Area. This secured sub-area may be referred to as the DPA Area and its LBA range does not conflict with the LBA ranges of both the User Area and the PARTIES Area. The LBA's for the DPA Area may range from a minimum value called DPA_MINIMUM to a maximum value called DPA_MAXIMUM. Using PARTIES technology, the disk drive may act on inquiries into LBA's that are within the range set by DPA_MINIMUM and DPA_MAXIMUM.

The present invention provides for a programming interface that is implemented in accordance with the present processes to ask the system firmware to open the PARTIES Area and alternatively, to create a sub-area within the storage area for DPA processing. Once the protected sub-area is organized and accessed, a user may issue different commands to perform various tasks in the sub-area. For example, the user may issue commands that allow the transfer of bulk data to and from the secured sub-area. Other commands may also be issued to perform operations on the data or offer additional semantics such as transactionality. If encryption is needed, the data can be encrypted and its cipher key can be selected by known process in accordance with AES (Advanced Encryption Standard) guidelines.

Data integrity for a message can be assured using an authentication algorithm and authentication key. The authentication algorithm accepts a message and the authentication key as inputs to calculate an authentication value. This authentication value is a short bit-string whose value depends on the authentication algorithm, the message and the key. One such authentication algorithm that can be used is the keyed hash function HMAC-SHA1. Alternative encryption and authentication algorithms will be clear to one skilled in the art.

The cipher key and the authentication key can be exchanged between the host device and the disk drive through the use of a public key agreement scheme such as the Diffie-Hellman (DH) scheme. The DH scheme calculates and transmits a public reference number based on the original key value. Once the public reference number is received, the original key can be securely derived using known process.

Figure 6:
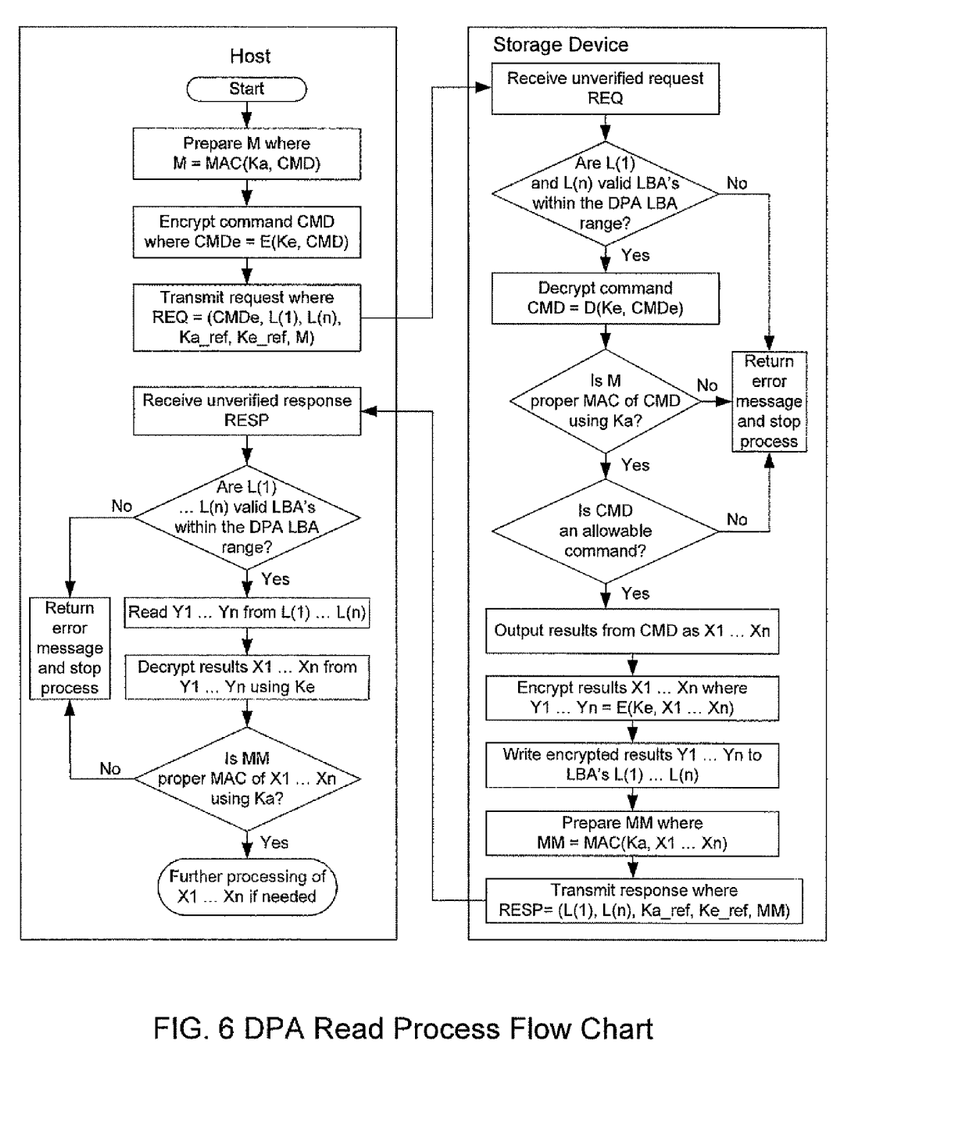
FIG. 6 is a flow diagram that illustrates a process in accordance with one embodiment of the present invention that allows a read command to be issued to a secured sub-area on a magnetic disk drive which was created using PARTIES technology.

FIG. 6 refers to a flow chart for a read operation to a protected sub-area has been created in the PARTIES Area using PARTIES technology. The first step in the process calls for the implementation of an authentication scheme that uses a keyed hash function such as the HMAC-SHA1 algorithm and a public key cryptographic system such as a Diffie-Hellman (DH) key agreement scheme. The HMAC-SHA1 algorithm is used to calculate an authentication value M using a secret authentication key Ka and the read command CMD. The command CMD is then encrypted using an encryption scheme such as AES and a secret cipher key Ke to produce an encrypted read command CMDe. Public reference numbers to the cipher key Ke_ref and to the authentication key Ka_ref are calculated by known process according to the Diffie-Hellman key agreement scheme. The encrypted read command CMDe, the lower LBA value of the target data block L(1), the upper LBA value of the target data block L(n), the public reference to the authentication key Ka_ref, the public reference to the cipher key Ke_ref and the authentication value M are sent as a request REQ to the disk drive.

The disk drive receives the unverified request REQ. It must authenticate and verify the transmitted data by first checking if L(1) and L(n) are within the range specified by DPA_MINIMUM and DPA_MAXIMUM. If they are not within the DPA LBA range, an error message is issued and the read process stops. If they are within the DPA LBA range, the disk drive derives the Ke and Ka from the public reference numbers Ke_ref and Ka_ref, using known process following the Diffie-Hellman key exchange scheme. The process then decrypts the command CMD using an AES decryption algorithm and Ke.

The disk drive then calculates an authentication value from the decrypted command CMD and the authentication key Ka, and compares this value to the transmitted authentication value M to determine the authenticity of the request REQ. If the two values are not the same and the authenticity of the command is not confirmed, an error message is issued and the process stops. If the two values are equal and the authenticity of the command is established, the process checks to see if the command CMD is an allowable command. If the command CMD is not allowed, the process issues an error message and the process stops. If the command CMD is allowed, the process executes the command CMD and the results are output as X1 . . . Xn. The results X1 . . . Xn are encrypted using the secret cipher key Ke and the encrypted results Y1 . . . Yn are written to LBA's L(1) . . . L(n).

The process prepares to transmit the results of the read process from the disk drive to the host device by first calculating another authentication value MM using the secret authentication key Ka and the unencrypted results X1 . . . Xn. The process may generate a new set of public reference numbers Ke_ref and Ka_ref using known process according to the Diffie-Hellman key agreement scheme. The process then transmit the lower LBA limit L(1), the upper LBA limit L(n), the public reference to the authentication key Ka_ref, the public reference to the cipher key Ke_ref and the authentication value MM to the host device. The host device receives the unverified response RESP. The process then checks if L(1) and L(n) are valid LBA's within the DPA LBA range. If either L(1) or L(n) are not within the valid LBA range, an error message is issued and the process stops. If both L(1) and L(n) are within the DPA LBA range, the process then proceeds by deriving Ke and Ka from Ke_ref and Ka_ref, respectively. The host device then reads the encrypted results Y1 . . . Yn from LBA L(1) . . . L(n) and decrypts them to produce the results X1 . . . Xn. The host device then calculates an authentication value using the decrypted results X1 . . . Xn and the secret authentication key Ka. This authentication value is compared to the transmitted authentication value MM. If the two values do not match, authentication is not confirmed and the process issues an error and the read process stops. If authentication is established, the results X1 . . . Xn are submitted to the host for further processing as needed.

Figure 7:
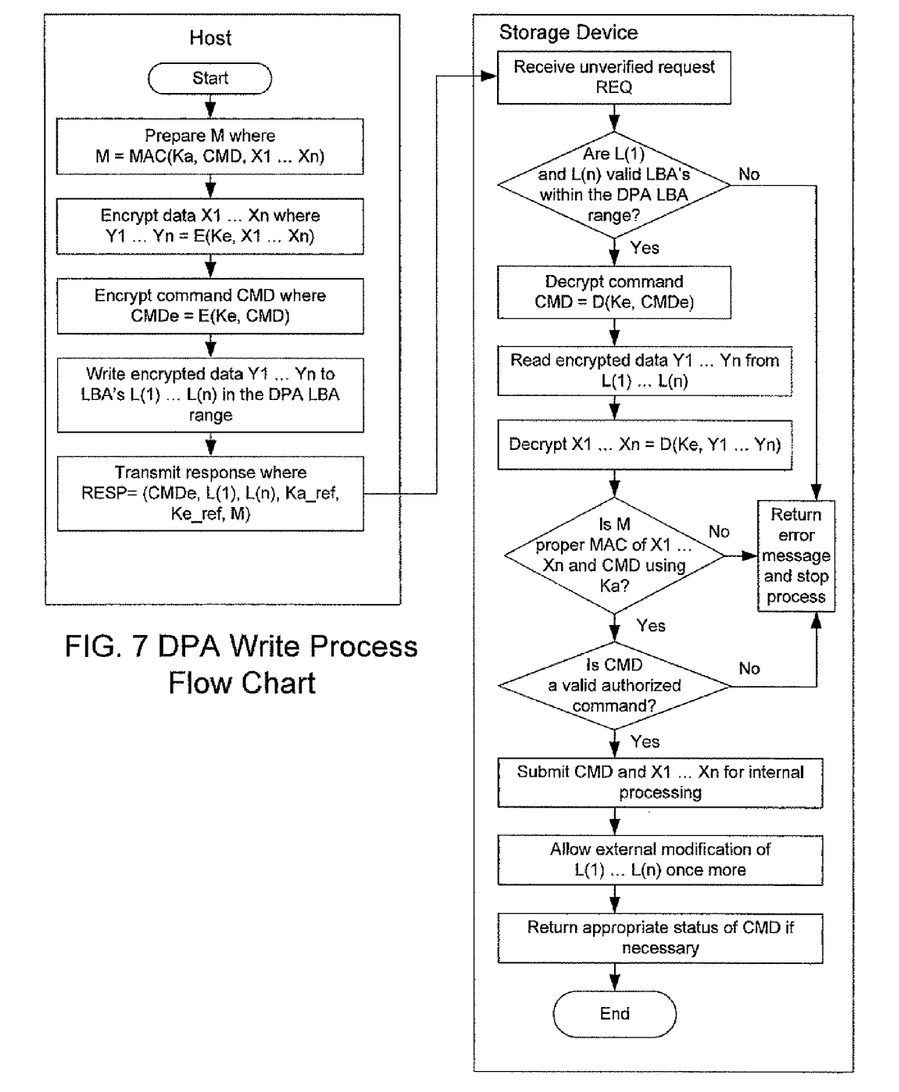
FIG. 7 is a flow diagram that illustrates a process in accordance with one embodiment of the present invention that allows a write command to be issued to a secured sub-area on a disk drive which was created using PARTIES technology.

FIG. 7 refers to a flow chart for a write operation to a protected sub-area that has been created by PARTIES technology. The first step in the process calls for the use of HMAC-SHA1 algorithm to calculate an authentication value M using a secret authentication key Ka, the write command CMD, and the data X1 . . . Xn. The data X1 . . . Xn and the write command CMD are encrypted using AES encryption and a secret cipher key Ke to produce the ciphertext Y1 . . . Yn and the encrypted write command CMDe, respectively. The host device also generates a Diffie-Hellman number using known process for use as the public references to Ke and Ka. The process then writes the ciphertext Y1 . . . Yn to LBA's L(1) . . . L(n). The encrypted read command CMDe, the lower LBA value L(1), the upper LBA value L(n), the public reference to the authentication key Ka_ref, the public reference to the cipher key Ke_ref and the authentication value M are sent as a request REQ to the disk drive.

The disk drive receives the unverified request REQ. It authenticates and verifies the transmitted request by first checking if L(1) and L(n) are within the range specified by DPA_MINIMUM and DPA_MAXIMUM. If they are not within the DPA LBA range, an error message is issued and the read process stops. If they are within the DPA LBA range, the disk drive decrypts CMD and X1 . . . Xn from CMDe and Y1 . . . Yn using AES decryption algorithm and the appropriate Ke that is derived from the Diffie-Hellman number in Ke_ref.

The disk drive then calculates an authentication value using CMD, X1 . . . Xn and the authentication key Ka (which is derived from the Diffie-Hellman number in Ka_ref), and compares the value to the transmitted authentication value M to determine the authenticity of CMD and X1 . . . Xn. If the two values are not the same and the authenticity of CMD and X1 . . . Xn is not confirmed, an error message is issued and the write process stops. If the two values are equal and the authenticity of CMD and X1 . . . Xn is established, the process checks to see if the command CMD is an authorized command. If the command CMD is not allowed, the process issues an error message and the write process stops. If the command CMD is allowed, the process writes X1 . . . Xn to L(1) . . . L(n). The process may optionally return the appropriate status of CMD to the host device.

Figure 8:
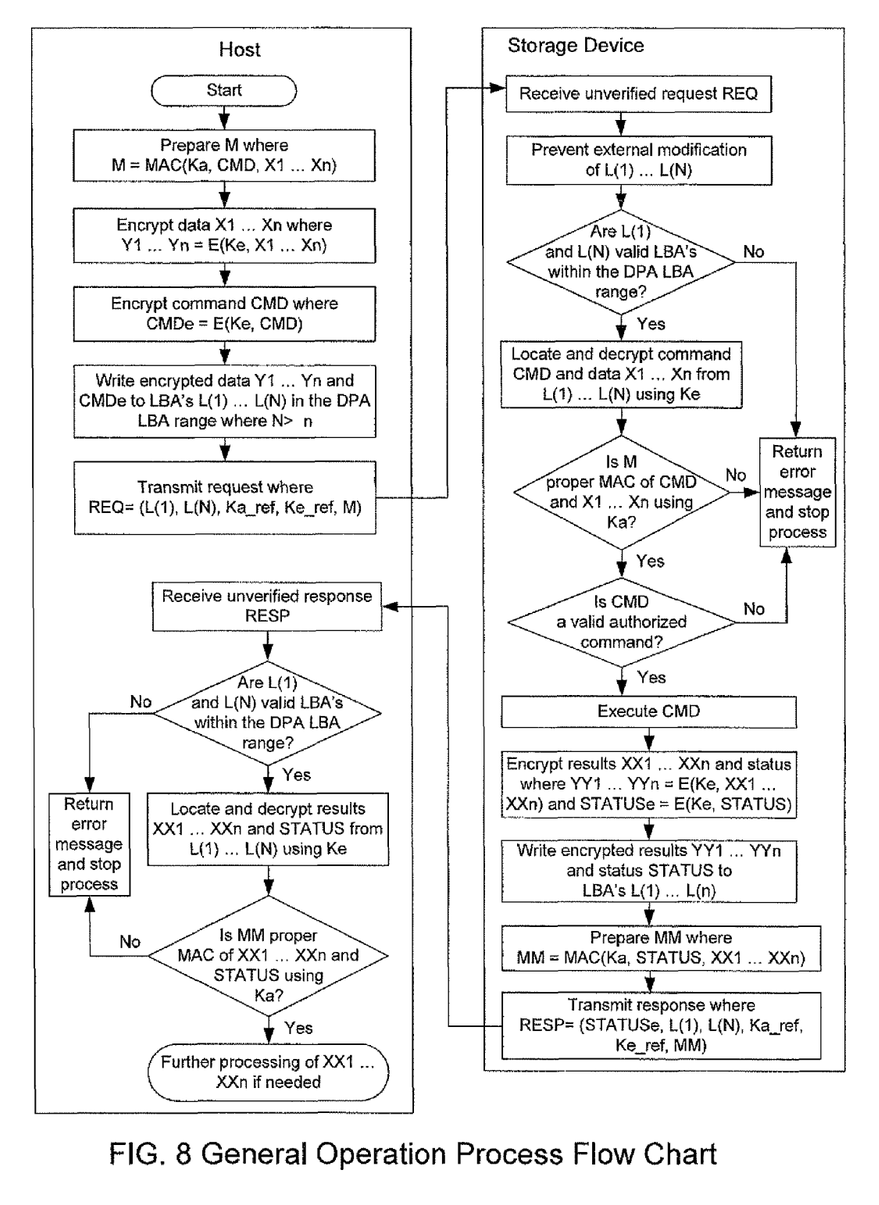
FIG. 8 is a flow diagram that illustrates a process in accordance with one embodiment of the present invention which allows a general command to be carried to the disk drive as one or more of the LBA's and a status to be returned as one or more of the LBA's.

In an alternate embodiment, a general command CMD and/or its status can be carried as one or more of the LBA's. FIG. 8 refers to a flow chart for a general operation associated with a general command issued to a protected sub-area has been created on the storage medium using PARTIES technology. The first step in the process calls for the host device to calculate an authentication value M using a secret authentication key Ka, the general command CMD, and the cleartext X1 . . . Xn. The cleartext X1 . . . Xn and the CMD are then encrypted using an AES encryption scheme and a secret cipher key Ke to produce the encrypted data Y1 . . . Yn and the encrypted general command CMDe. The process writes CMDe and Y1 . . . Yn to the LBA's L(1) . . . L(N) where N is equal or larger than n due to the extra data blocks that are used to store CMDe. The process then generates the public Diffie-Hellman numbers for use as the public reference to the cipher key Ke_ref and the authentication key Ka_ref. The lower LBA value L(1), the upper LBA value L(N), the public reference to the authentication key Ka_ref, the public reference to the cipher key Ke_ref and the authentication value M are sent as a request REQ to the disk drive.

The disk drive receives the unverified request REQ and prevents external modification of L(1) . . . L(N). It proceeds to check if L(1) and L(N) are within the range specified by DPA_MINIMUM and DPA_MAXIMUM. If they are not within the DPA LBA range, an error message is issued and the read process stops. If they are within the DPA LBA range, the process locates and decrypts the data X1 . . . Xn and CMD from L(1) . . . L(N) using the AES decryption algorithm and a cipher key Ke that is derived using known process from Ke_ref. The decrypted results are used with the authentication key Ka, that is derived using known process from Ka_ref, to calculate an authentication value. This authentication value is compared to the transmitted authentication value M to determine the authenticity of the request REQ. If the two values are not the same and the authenticity of the command is not confirmed, an error message is issued and the process stops. If the two values are equal and the authenticity of the command is established, the process checks to see if the command CMD is an allowable command. If the command CMD is not allowed, the process issues an error message and the process stops. If the command CMD is allowed, the process executes the command CMD and the results are output as XX1 . . . XXn along with a status value STATUS. The results XX1 . . . XXn and STATUS are encrypted using the secret cipher key Ke to produce the encrypted results YY1 . . . YYn and STATUSe, which are written to LBA's L(1) . . . L(N).

The process prepares to transmit the results of the general operation to the host device by first calculating another authentication value MM using the secret authentication key Ka, XX1 . . . XXn, and STATUS. The disk drive then transmits STATUSe, lower LBA limit L(1), the upper LBA limit L(N), Ka_ref, Ke_ref and MM to the host device.

The host device receives the unverified response RESP. The host device then checks if L(1) and L(N) are valid LBA's within the DPA LBA range. If either L(1) or L(N) are outside the valid LBA range, an error message is issued and the process stops. If both L(1) and L(N) are within the DPA LBA range, the process then locates and reads the encrypted results YY1 . . . YYn and STATUSe from LBA L(1) . . . L(N). The results XX1 . . . XXn and STATUS are respectively decrypted from Y1 . . . Yn and STATUSe using the secret cipher key Ke which is derived from the public reference to the cipher key Ke_ref. The process then calculates an authentication value using the decrypted results XX1 ... XXn, the STATUS value and Ka. This authentication value is compared to MM to authenticate the results. If authentication is not confirmed, the process issues an error and the read process stops. If authentication is established, the STATUS is registered and the results XX1 ... XXn may now be used by the host device for further data processing.

Even though particular embodiments use a symmetric key system where the encrypting and decrypting algorithm uses similar keys, it will be appreciated by those skilled in the art that the invention may also use an asymmetric key system, use a family of secret keys or that a family of secret keys may be derived from one or more master keys. In addition, the invention may use another encryption scheme besides AES such as Data Encryption Standard (DES) or triple DES to add uncertainty to the ciphertext. It may also use another scheme besides HMAC-SHA1 such as HMAC-SHA256 and HMAC-MD5 to calculate the authentication values that are used to verify the integrity and authenticate the origin of the data. Consequently, other public key agreement scheme besides the Diffie-Hellman key agreement scheme may be used to exchange or generate the encryption key(s) between the host and the disk drive. For example, instead of generating and transmitting a reference number based on the encryption key, the system may choose to transmit a strictly literal reference (i.e. key label, key ID) that can be used to look up the correct encryption key according to a key/ID table that is known only to the host and the disk drive.

Although some of the embodiments uses an authentication scheme to check for authorization or authenticity of the inquiries to the DPA area, the invention may also use the DPA space in an unprotected mastering mode, where the disk drive will respond to inquiries regarding the range of LBA's that pertain to the DPA space as in use or as not in use. These requests are not checked for authorization or authenticity but instead, the use/not-in-use flags are for employed as hints to avoid collisions between properly behaved clients. This method can be regarded as a form of mastering without authentication.

Even though some of the embodiments describe a scheme where the command CMD is either a read or write command, the invention may also issue other commands to a drive endpoint such as commands that follow ISO-7816 standards or other smartcard based APDU. Alternative embodiments using an alternative command such as an ATA command or other specified operation for the storage-resident endpoint to perform would be clear to one skilled in the art.

It is appreciated that detailed discussion of the actual implementation of each step that comprises the process is not necessary for an enabling understanding of the invention. The actual implementation is well within the routine skill of a programmer and computer engineer, given the disclosure herein of the system attributes, functionality and inter-relationship of the various software and hardware components in the system. A person skilled in the art, applying ordinary skill can practice the present invention without undue experimentation.

While particular embodiments of the invention have been described herein for the purpose of illustrating the invention and not for the purpose of limiting the same, it will be appreciated by those of ordinary skill in the art that various modifications and improvements may be made without departing from the scope and spirit of the invention. For example, the bulk data transport scheme can be easily modified to accommodate the situation in which the disk drive may transfer bulk data without the use of encryption, verification and/or authentication to reduce data and command validation costs while permitting simple mastering functions.

The process and system of the present invention has been described above in terms of functional steps in a flow chart format. It is understood that unless otherwise stated to the contrary herein, one or more functions may be integrated in a single physical device or a software module in a software product, or a function may be implemented in separate physical devices or software modules, without departing from the scope and spirit of the present invention. It will be further appreciated that the line between hardware and software is not always sharp.

Accordingly, it is to be understood that the invention is not to be limited by the specific illustrated embodiments, but only by the scope of the appended claims.

The invention claimed is:

1. A method comprising:
defining a protected area in addition to a user area for data storage in a data storage device;
defining a secured sub-area within the protected area
receiving a request to execute a command associated with a logical block address (LBA) between a minimum LBA and a maximum LBA of the secured sub-area;
accessing the secured sub-area while executing the command; and
buffering data in the secured sub-area when the command is to read or write data to the user area.

2. The method of claim 1, wherein the protected area is not user accessible under operation of an operating system of a host device to which the data storage device is associated.

3. The method of claim 1, wherein the data storage device comprises a disk drive having a magnetic storage medium, and wherein the protected area is at least one of a Hidden System Area and PARTIES Area on the magnetic storage medium.

4. The method of claim 1, wherein the data storage device comprises a disk drive having a magnetic storage medium, and wherein the protected area comprises a Host Protected Area on the magnetic storage medium which is accessible by software or firmware.

5. The method of claim 1, wherein the data storage device comprises a disk drive having a magnetic storage medium in which the protected area is located, and wherein the secured sub-area is defined by a range of LBA values within the protected area, and the secured sub-area is accessed by addressing using LBA values.

6. The method of claim 5, wherein the buffering step comprises accessing data in the protected area using LBA.

7. The method of claim 1, further comprising, while buffering data in the secured sub-area, performing a data authentication operation.

8. The method as in claim 1, wherein at least one of accessing of the secured sub-area data buffering in the secured sub-area is under control by a controller provided within the data storage device.

9. The method as in claim 1, wherein at least one of accessing of the secured sub-area and data buffering in the secured sub-area is under control by software or firmware external to the data storage device.

10. A method comprising:
receiving a request that references a secured sub-portion of a protected area in a data storage device that is separate from a user data storage area of the data storage device;
buffering a command in the secured sub-portion when the command is to read or write data to the user data storage area;

in response to the request, accessing the secured sub-portion of the protected area to retrieve a command stored in the secured sub-portion of the protected area; and
executing the command.

11. A device, comprising:
a data storage medium, wherein a protected area in addition to a user area are defined for data storage;
a secured sub-area is defined within the protected area for buffering data in the secured sub-area when a command is to read or write to the user area;
a controller adapted to:
  receive a request from a host system to execute a command, the request comprising at least one logical block address (LBA), and
  executing the command when the at least one LBA is within the secured sub-area of the protected area.

12. The device of claim 11, wherein the protected area is not user accessible under operation of an operating system of a host device to which the data storage medium is associated.

13. The device of claim 11, wherein the device comprises a disk drive having a magnetic storage medium, and wherein the protected area is at least one of a Hidden System Area and PARTIES Area on the magnetic storage medium.

14. The device of claim 11, wherein the device comprises a disk drive having a magnetic storage medium, and wherein the protected area comprises a Host Protected Area on the magnetic storage medium which is accessible by software or firmware.

15. A data processing system, comprising:
a data storage device comprising the device of claim 11; and
a host system operatively coupled to the data storage device, said host system comprising a processor and an operating system, wherein the processor is adapted to transfer data to and from the data storage device for read and write operations.

16. The system as in claim 15, wherein the protected area is not user accessible under operation of the operating system of the host system.

17. The device of claim 11 wherein the secured sub-area is set aside to facilitate temporary data buffering between the host system and the user area of the data storage medium.

18. The device of claim 17, wherein the secured sub-area comprises a portion of the protected area set aside to facilitate bulk data transfer, wherein data and commands are buffered in the secured sub-area for data read and write operations to the user area.

19. The device of claim 18, wherein the device comprises a disk drive having a magnetic storage medium on which the protected area is located, and wherein the secured sub-area is defined by a range of LBA values within the protected area, and the secured sub-area is accessed by addressing using LBA values.

* * * * *